United States Patent
Ishii

(10) Patent No.: US 10,284,772 B2
(45) Date of Patent: May 7, 2019

(54) IMAGE MONITORING SYSTEM AND IMAGE MONITORING PROGRAM

(71) Applicant: SONY CORPORATION, Tokyo (JP)

(72) Inventor: Satoshi Ishii, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/958,254

(22) Filed: Apr. 20, 2018

(65) Prior Publication Data

US 2018/0241935 A1 Aug. 23, 2018

Related U.S. Application Data

(63) Continuation of application No. 14/951,632, filed on Nov. 25, 2015, now Pat. No. 9,979,879, which is a continuation of application No. 14/503,983, filed on Oct. 1, 2014, now Pat. No. 9,270,949, which is a continuation of application No. 13/494,080, filed on Jun. 12, 2012, now Pat. No. 8,860,808, which is a continuation of application No. 11/713,287, filed on Mar. 2, 2007, now Pat. No. 8,218,010.

(51) Int. Cl.
| | |
|---|---|
| H04N 7/18 | (2006.01) |
| H04N 5/232 | (2006.01) |
| G08B 13/196 | (2006.01) |
| G06F 3/0481 | (2013.01) |
| H04N 7/08 | (2006.01) |
| H04N 9/87 | (2006.01) |

(52) U.S. Cl.
CPC ....... *H04N 5/23216* (2013.01); *G06F 3/0481* (2013.01); *G08B 13/19682* (2013.01); *H04N 5/23206* (2013.01); *H04N 5/23293* (2013.01); *H04N 7/0806* (2013.01); *H04N 7/18* (2013.01); *H04N 7/181* (2013.01); *H04N 9/87* (2013.01)

(58) Field of Classification Search
CPC ........... H04N 5/23293; H04N 5/23206; H04N 5/23216; H04N 7/18; H04N 7/181; H04N 7/0806; H04N 9/87; G06F 3/0481; G08B 13/19682
USPC ......................................................... 348/143
See application file for complete search history.

(56) References Cited

U.S. PATENT DOCUMENTS

| | | |
|---|---|---|
| 2004/0117638 A1 | 6/2004 | Monroe |
| 2010/0002082 A1 | 1/2010 | Buehler et al. |

FOREIGN PATENT DOCUMENTS

| | | |
|---|---|---|
| JP | 9 46668 | 2/1997 |
| JP | 9 271021 | 10/1997 |
| JP | 10 336631 | 12/1998 |

(Continued)

*Primary Examiner* — Joseph E Avellino
*Assistant Examiner* — Marshall M McLeod
(74) *Attorney, Agent, or Firm* — Haug Partners LLP; William S. Frommer

(57) ABSTRACT

Disclosed herein is an image monitoring system including: a camera connected to a network; display means for displaying an image captured by the camera; and display control means for controlling display such that, in displaying images by the display means, an image is displayed in a window having a predetermined layout; wherein the display control means presets an allocation database containing a correlation between the window having a predetermined layout and a camera identification code and, when the camera is connected to the network, automatically sets a correlation between the camera identification code in the allocation database and the camera, thereby controlling image display into the window on the basis of the allocation database.

18 Claims, 8 Drawing Sheets

(56) References Cited

FOREIGN PATENT DOCUMENTS

| | | |
|---|---|---|
| JP | 2000 243062 | 9/2000 |
| JP | 2001 309368 | 11/2001 |
| JP | 2005 236973 | 9/2005 |

IMAGE MONITORING SYSTEM AND IMAGE MONITORING PROGRAM

CROSS REFERENCES TO RELATED APPLICATIONS

This is a continuation of application Ser. No. 14/951,632, filed Nov. 25, 2015, which is a continuation of application Ser. No. 14/503,983, filed Oct. 1, 2014, now U.S. Pat. No. 9,270,949, issued on Feb. 23, 2016, which is a continuation of application Ser. No. 13/494,080, filed Jun. 12, 2012, now U.S. Pat. No. 8,860,808, issued on Oct. 14, 2014, which is a continuation of application Ser. No. 11/713,287, filed Mar. 2, 2007, now U.S. Pat. No. 8,218,010, issued on Jul. 10, 2012, which is entitled to the priority filing of Japanese Application No. 2006-059026, filed Mar. 6, 2006, the entirety of which is incorporated herein by reference.

BACKGROUND OF THE INVENTION

1. Field of the Invention

The present invention relates to an image monitoring system and an image monitoring program that can display, in a predetermined layout, image taken by a camera connected to a network and record and reproduce the image captured from that camera.

2. Description of the Related Art

Image monitoring systems are used to monitor images captured from a plurality of cameras simultaneously displayed on one monitor display in a partitioned manner and record captured images to reproduce later as necessary, for example. Recently, for the purpose of enhanced security, image-based monitoring activities are practiced in various places, such as company parking lots, streets, schools, and homes, in addition to banks, convenience stores, and other monitored facilities in related art, for example (refer to Japanese Patent Laid-open No. 2001-309368 and Japanese Patent Laid-open No. Hei 10-336631).

At the same time, network-based image monitoring systems in which a plurality of cameras are connected to a network and images taken by these cameras and transmitted through the network for display, storage, and reproduction have been quickly spreading due to the enhanced performance and reduced cost of cameras, the increased storage size and decreased cost of recording media, and the development of networks.

SUMMARY OF THE INVENTION

With the above-mentioned image mentoring systems, displaying images captured by a camera connected to a network into a window of a display monitor requires the user to execute operations of selecting a predetermined layout and then allocate an image captured by a camera to a particular window of the selected layout. Namely, capturing an image of a networked camera by the monitoring apparatus and allocating this image to a predetermined window require the user to manually allocate an image to a window of layout. These operations are very time and labor consuming. Especially, if there are many prepared layouts, many layouts must be allocated to one camera, thereby presenting problems of complicated operations in realizing a significantly simple and easy image monitoring setup.

Therefore, according to the embodiments of the present invention, it is desirable to provide an image monitoring system and an image monitoring program free from above mentioned problems. According to one embodiment of the present invention, there is provided an image monitoring system. This image monitoring system has a camera connected to a network; a display section configured to display an image captured by the camera; and a display control section configured to control such that, in displaying images by the display section, an image is displayed in a window having a predetermined layout; wherein the display control section presets an allocation database containing a correlation between the window having a predetermined layout and a camera identification code and, when the camera is connected to the network, automatically sets a correlation between the camera identification code in the allocation database and the camera, thereby controlling image display into the window on the basis of the allocation database.

According to another embodiment of the present invention, there is provided an image monitoring program to be executed on an image monitoring system. In this image monitoring program, program control by the display control section presets an allocation database containing a correlation between the window having a predetermined layout and a camera identification code and, when the camera is connected to the network, automatically sets a correlation between the camera identification code in the allocation database and the camera, thereby controlling image display into the window on the basis of the allocation database.

Because an allocation database containing the correlation between the window in a predetermined layout and a camera identification code is preset, connecting a camera to a network allows the automatic setting of the correlation between the camera identification code in the allocation database and the networked camera. Consequently, when a camera is connected to a network, the camera identification code related with the networked camera can be displayed in the window of a selected layout without executing any special allocating operation.

As described above and according to the embodiments of the present invention, by only connecting a camera to a network instantly allows the displaying of camera images into a window of a predetermined layout, thereby eliminating the necessity of the manual allocation of cameras by the user. Hence, by only connecting a camera to a network, the user can display images captured by a camera onto a display monitor without executing time and labor consuming operations, thereby realizing a significantly easy and simple image monitoring setup.

BRIEF DESCRIPTION OF THE DRAWINGS

The present invention will become apparent from the following description of embodiments with reference to the accompanying drawings in which.

DETAILED DESCRIPTION OF THE PREFERRED EMBODIMENTS

This invention will be described in further detail by way of embodiments thereof with reference to the accompanying drawings. Now, referring to FIG. 1, there is shown a schematic diagram illustrating an exemplary configuration of an image monitoring system according to an embodiment of the present invention. Referring to FIG. 2, there is shown a schematic diagram illustrating an exemplary configuration of an image monitoring program according to another embodiment of the present invention.

Figure 1:
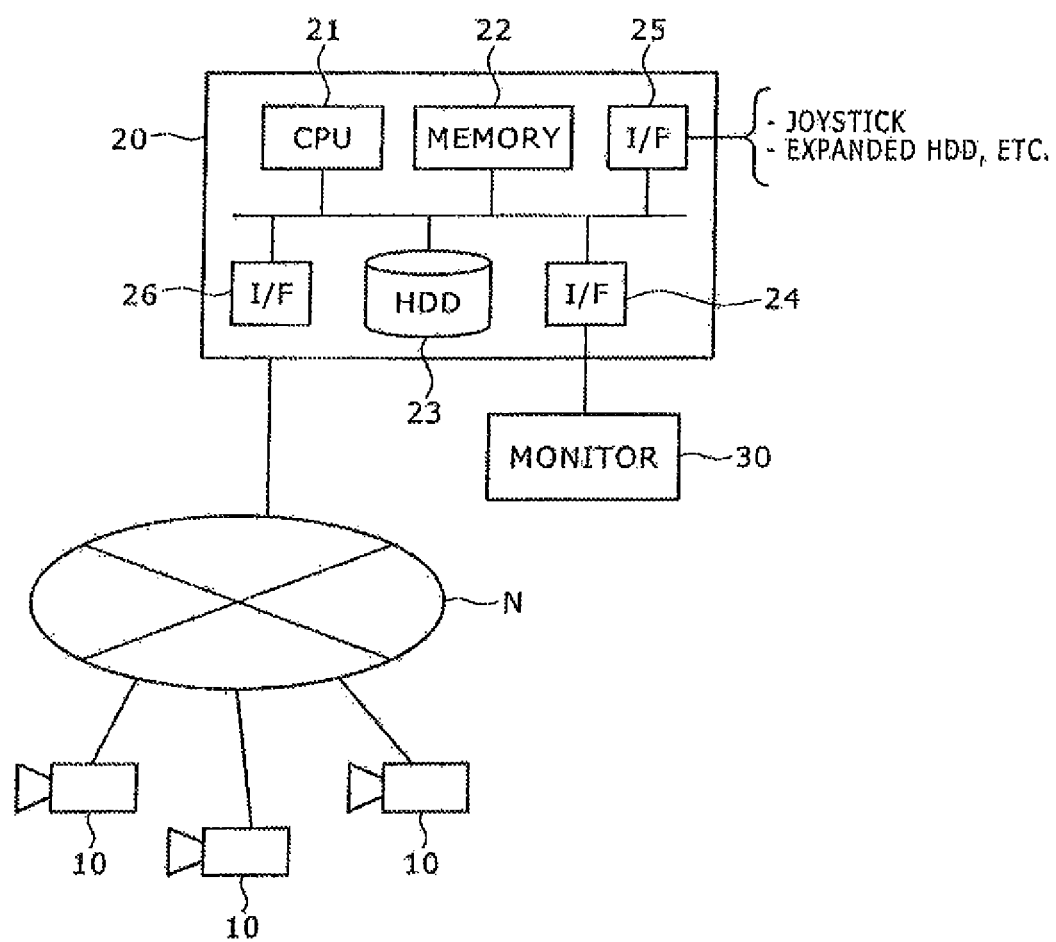
FIG. 1 is a schematic diagram illustrating an exemplary configuration of an image monitoring system practiced as one embodiment of the present invention.
Figure 2:
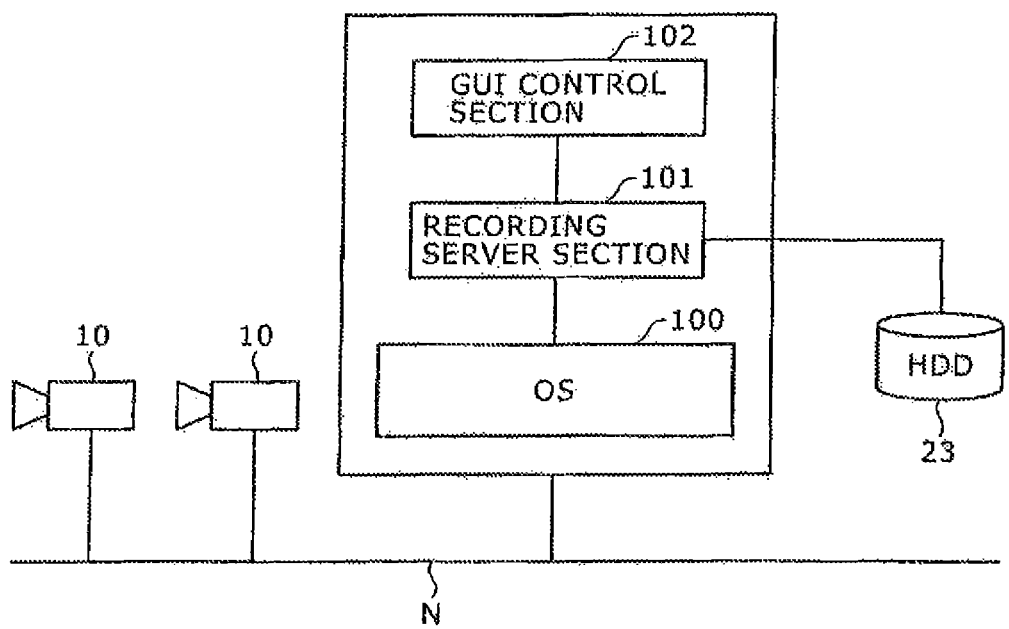
FIG. 2 is a schematic diagram illustrating an exemplary configuration of an image monitoring program practiced as another embodiment of the present invention.

As shown in FIG. 1, an image monitoring system according to the present embodiment includes a camera 10 (or cameras 10) connected to a network N, a monitoring apparatus 20 connected to the same network N, and a monitor (or a display section) 30 connected to the monitoring apparatus 20. In this image monitoring system, an image captured by the camera 10 is transmitted to the monitoring apparatus 20 via the network N in a predetermined data format (for example, JPEG (Joint Photographic Experts Group) or MPEG-4 (Moving Picture Experts Group phase 4)). The image received by the monitoring apparatus 20 is displayed on the monitor 30 connected to the monitoring apparatus 20 or stored in a HDD (Hard Disk Drive) 23, a storage section arranged on the monitoring apparatus 20. It is also practicable to search the HDD 23 for desired images and reproduce searched images.

In order to manage the image supplied from the camera 10 via the network N, the monitoring apparatus 20 includes: a CPU 21, a control section, for executing an image monitoring program; a memory 22, such as a RAM (Random Access Memory) used as a work area for image processing or the like; and the HDD 23 as a storage section for sequentially storing images supplied from the camera 10. The monitoring apparatus 20 further includes: a monitor interface 24 for connecting the monitor 30; an external device interface 25 for connecting external devices, such as a joystick and an extended HDD for example; and a network interface 26 for connecting the present system to the network N.

The image monitoring program to be executed by the CPU 21 includes: of a recording server section 101 to be executed in an operating system 100; and a GUI (Graphical User Interface) control section 102 as shown in FIG. 2. The recording server section 101 records each image supplied from the camera 10 along with a camera identification number, recording date, and data compression algorithm, for example, thereby executing the processing of building an image database. The recording server section 101 also searches the HDD 23 for specified images already recorded in HDD 23 and reproduces the searched images.

The GUI control section 102 is a display controller which executes window control processing for displaying image on the monitor 30 (refer to FIG. 1); display control processing for allocating image to windows and displaying various control buttons (or icons) to windows; and control processing for accepting commands from a user through an input section, such as mouse, keyboard, functional buttons, and joystick, for example.

The above-mentioned system configuration and program configuration supply the image captured by the camera 10 to the monitoring apparatus 20 via the network N to be displayed on the monitor 30. If a plurality of cameras 10 are connected to the network N, then each of images captured by these cameras may be displayed in each of windows, which are displayed on the monitor 30 as arranged in a predetermined manner. Alternatively, a window for one particular camera 10 may be displayed on the entire monitor 30. If the camera 10 has pan, tilt and zoom capabilities, the user may use these capabilities of the camera 10 to display a resultant image on the monitor 30.

Images captured by the camera 10 are sequentially recorded to the HDD 23 to build an image database. When an image database is built in the HDD 23, the user can access the image database from the monitoring apparatus 20 to search desired images and, because the monitoring apparatus 20 is also connected to the network N, access the image database from an external personal computer, for example, connected to the network N to reference desired images.

In displaying images captured by the camera 10 connected to network N onto the monitor 30, the image monitoring system according to the embodiment of the present invention can instantly display an image captured by the camera 10 into a window having a preset layout without executing any special operations.

The above-mentioned controlling of display layouts is realized by the program control by the GUI control section 102, which becomes effective especially when displaying images captured by a plurality of cameras into a plurality of windows on a one in one basis.

Figure 3:
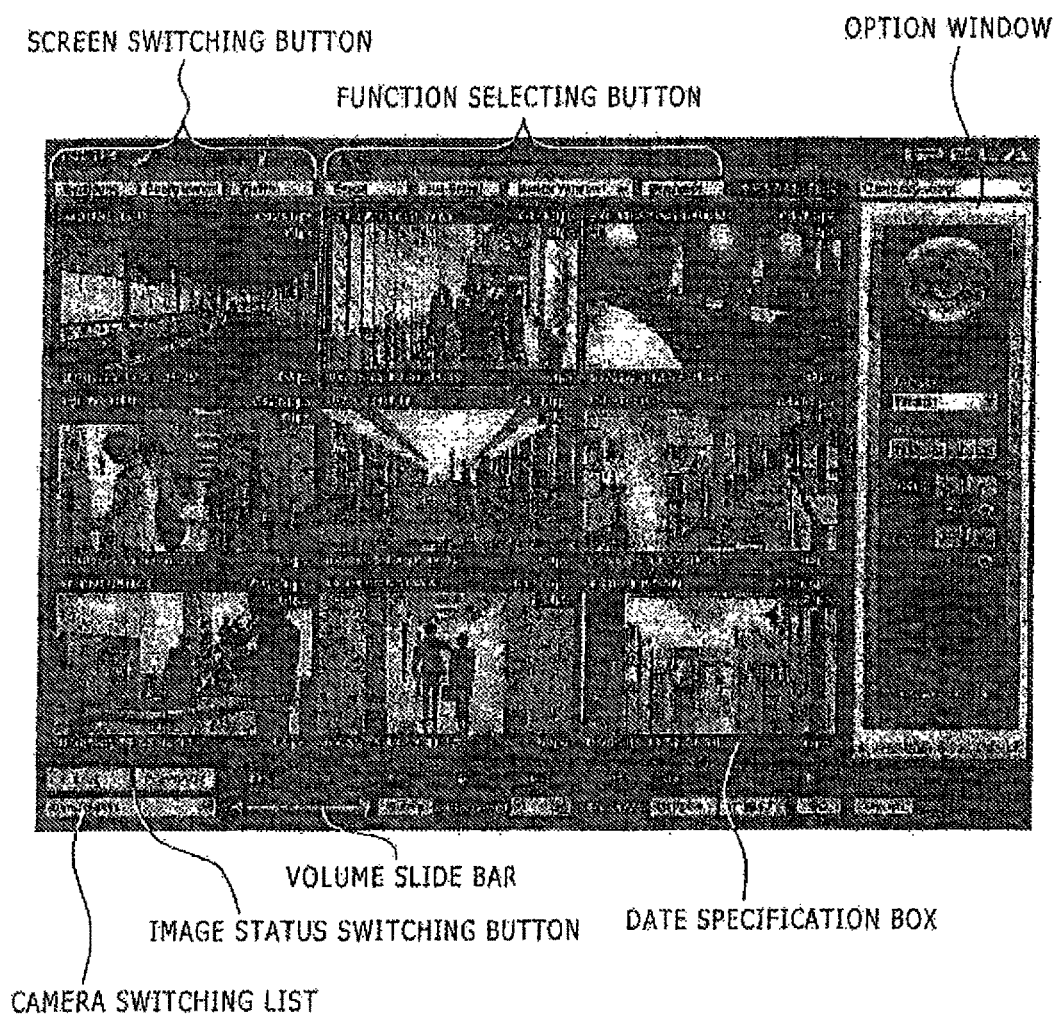
FIG. 3 is a diagram illustrating an exemplary display of images captured from a plurality of cameras onto a monitor.

Referring to FIG. 3, there is shown an example in which images captured from a plurality of cameras are displayed onto the monitor. To be more specific, the images supplied from two or more cameras are displayed in two or more windows, which are arranged in a matrix manner. In the example shown in FIG. 3, a total of nine windows (3×3) are displayed, in each of which an image captured by a different camera is displayed. Namely, the images supplied from a total of nine cameras can be referenced at the same time. It should be noted that the number of windows that can be displayed and the display layout can be selected by the user as desired.

Arranged upper side of the whole window displaying images, screen switching buttons and function selecting buttons are arranged. The screen switching buttons selects contents to be displayed on the entire window and include a "monitoring" button for displaying an image captured by a camera, a "configuration" button for setting basic settings, and a "system" button for setting system settings.

The function selecting buttons include an "export" button for outputting images captured by a camera to an external recording media, a "full screen" button for displaying a selected window on the full screen, a "monitor window" button for selecting a layout (3×3, 2×2, or the like) of two or more windows, and a "sequence" button for starting or stopping a monitor sequence for automatically switching between screens.

Arranged lower side of the whole window are an image display window status (displaying of current image or reproducing of past image) switching button, a reproduction/recording operation button, a camera selecting button, a volume setting slide bar, and a box for specifying the date and time for search for past image.

In addition, to the right side of the whole window, an option window is arranged. For the option window, "camera control", "list of recording cameras", "list of recorded images", "alarm log", "system log", "list of alarm output situations", "list of sensor input situations", "list of moving body detection situations", and "manual trigger" can be selected by the window switching button.

Selecting "camera control" switches to a window display for controlling the panning, tilt, and zoom of a specified window, and the camera functions, such as focus and brightness. Selecting "list of recording cameras" displays a list of cameras that are taking image onto the option window. Selecting "list of recorded images" displays a list of recently recorded images onto the option window.

Selecting "alarm log" displays an alarm-associated log onto the option window. Selecting "system log" displays a log associated with system information and system error onto the option window. Selecting "list of alarm output situations" displays a list of current alarm output situations onto the option window. Selecting "list of sensor input situations" displays a list of current sensor input situations onto the option window.

Selecting "moving body detection situations" displays current moving body detection information onto the option windows. Selecting "manual trigger" displays a list of manually triggered actions onto the option window.

If "camera control" is displayed on the option window with the window displayed with image specified and an arrow button, for example, is selected, the user can perform panning or tilting of the camera transmitting image to that window or specify zoom-in or zoom-out of the image by selecting the zoom button.

In order to reference image captured in the past, the user selects the window in which the current image transmitted from the camera by which the desired past image was captured is displayed and inputs the referenced past date on which into the date specification box. In the present embodiment, the date specification box is arranged in the lower right corner of the whole window, by which the user can specify one date and time common to a plurality of windows.

It is also practicable to simultaneously specify two or more windows that correspond to the camera by which the past image to be referenced was captured. If two or more windows are specified, there is one box in which the date is specified, so that one date and time common to two or more windows can be specified in this box.

In displaying camera images onto the above-mentioned windows, the present embodiment provides a plurality of window layouts beforehand and an allocation database for indicative of a correlation between window and camera ID (identification code) for the plurality of layouts.

Figure 4:
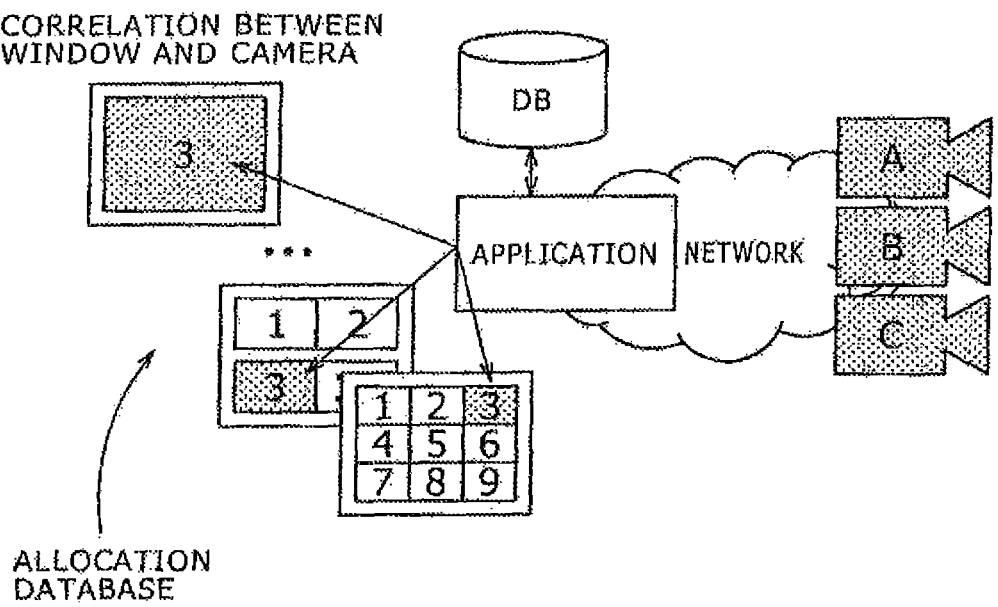
FIG. 4 is a schematic diagram illustrating a concept of an allocation database.

Referring to FIG. 4, there is shown a schematic diagram illustrating a concept of the above-mentioned allocation database. Various types of window layouts to be displayed on the monitor are prepared. Generally, matrix layouts, such as 1×1, 2×2, 3×3, and so on, are used, for example. Also, the user can set desired layouts other than these types.

In the layouts as mentioned above, the correlation between windows and camera IDs to be arranged in each layout is an allocation database. In the example shown in FIG. 4, camera ID "3" is allocated to one window having 1×1 layout, camera IDs "1" through "4" are allocated to four windows having 2×2 layout, and camera IDs "1" through "9" to nine windows having 3×3 layout.

In addition, camera IDs are tied to camera IP addresses on a one to one basis. This correlation between camera ID and camera IP address is executed when the user specifies the searching for a camera connected to the network or an automatic search operation is executed in a predetermined timed relation, for example.

For example, if camera C is connected to the network and the IP address of camera C is registered at camera ID "3", the image captured by camera C is displayed in a window having the camera ID of the layout to which camera ID "3" is allocated. To be more specific, when the user selects the 1×1 layout allocated with camera ID "3", the image of camera C is displayed in one window; when the user selects the 2×2 layout, the image of camera C is displayed in the lower left window of the 2×2 windows allocated with camera ID "3"; and when the user selects the 3×3 layout, the image of camera C is displayed in the upper right window of the 3×3 windows allocated with camera ID "3".

With related-art systems, no allocation is made to windows of particular layouts, so that it is necessary for the user to execute, after connecting a camera to the network, an operation of allocating the IP address of the camera to the window of a desired layout. If many layouts are prepared, the user should allocate the IP address of the connected camera to the window of each of these layouts.

In the present embodiment, a camera ID is allocated to the window of each layout in advance and this camera ID is automatically related with the camera IP address at the time of network connection, so that only connecting the camera to the network allows the displaying of image captured by the camera into a predetermined layout.

Figure 5:
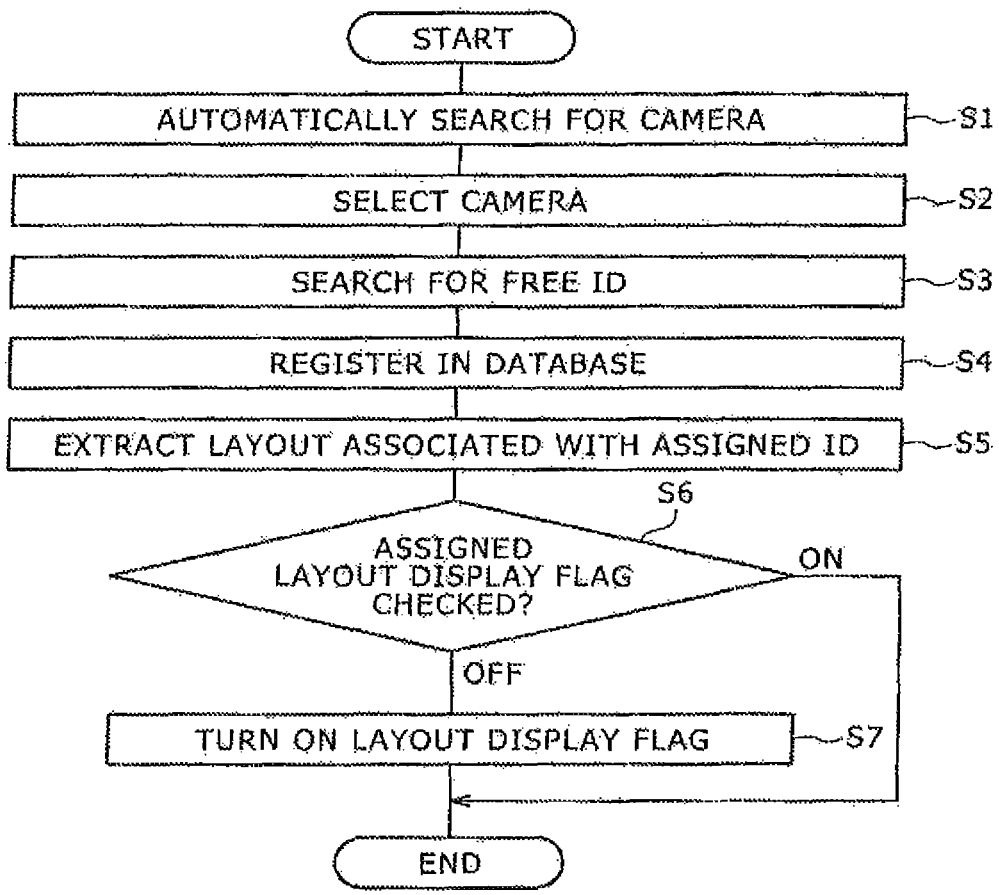
FIG. 5 is a flowchart indicative of processing to be executed in the above-mentioned image monitoring program.

Referring to FIG. 5, there is shown a flowchart indicative of the processing to be executed in an image monitoring program practiced as one embodiment of the present invention. The layouts of windows to be used are registered in advance and camera IDs are assigned, to the windows of the layouts, in correspondence with the number of cameras that can be registered. Any layout to which no camera ID is assigned has no use value, so that the display flag of that layout is turned off, thereby setting that layout to non-display status in each application.

First, all cameras existing in a same segment on the network are automatically searched for in a broadcast manner (step S1). Next, the user selects a camera to be registered from among the searched cameras (step S2) and then extracts the lowest layout camera ID that is not currently used (step S3). Extracting the lowest camera ID allows the assignment of a camera to each dropped window that is not used in layout.

Next, the camera ID for uniquely identifying each camera to be used in applications and the camera ID for layout are stored together in the database (step S4). This processing can holds the information about the relating of the camera ID necessary for acquiring camera images and the layout camera ID for determining a display position in each layout.

Next, from the layouts created in advance, a layout is extracted for holding a newly allocated layout camera ID (step S5). Then, the display flag of the extracted layout is checked (step S6). If the display flag is found to be off, then it is determined that a camera has been allocated for the first time to provide a usage value, upon which the display flag is turned on (step S7). Consequently, that layout becomes usable (or displayed) for the first time.

The above-mentioned processing flow allows the automatic creation of layouts and the automatic allocation of a camera to each layout which was executed manually by the user in related art. The above-mentioned processing flow further allows various operations such as image monitoring and recording immediately after camera registration.

Figure 6:
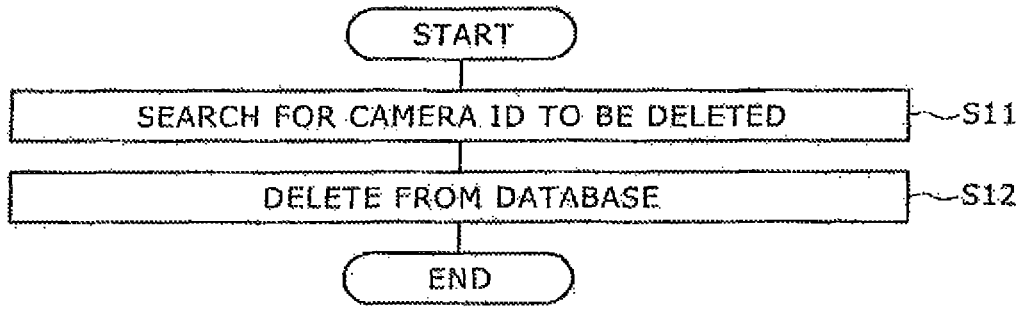
FIG. 6 is a flowchart indicative of processing to be executed when deleting a camera.

Referring to FIG. 6, there is shown a flowchart indicative of the processing of camera deletion. In order to uninstall a camera from the network or deallocate a camera, the processing of deleting camera registration is executed. In this processing, first, the database is searched for the camera ID of a camera to be deleted (step S11) and then the camera related with that camera ID (for example, the IP address of the camera) is deleted from the database (step S12). Thus, in deleting the registration of a camera, only the deletion from the database is executed, and the assigned IDs are not reallocated. Consequently, in the replacement of cameras due to camera troubles, a new camera can be assigned to the same position, holding the arrangement of layout as it was before the deletion.

Figure 7:
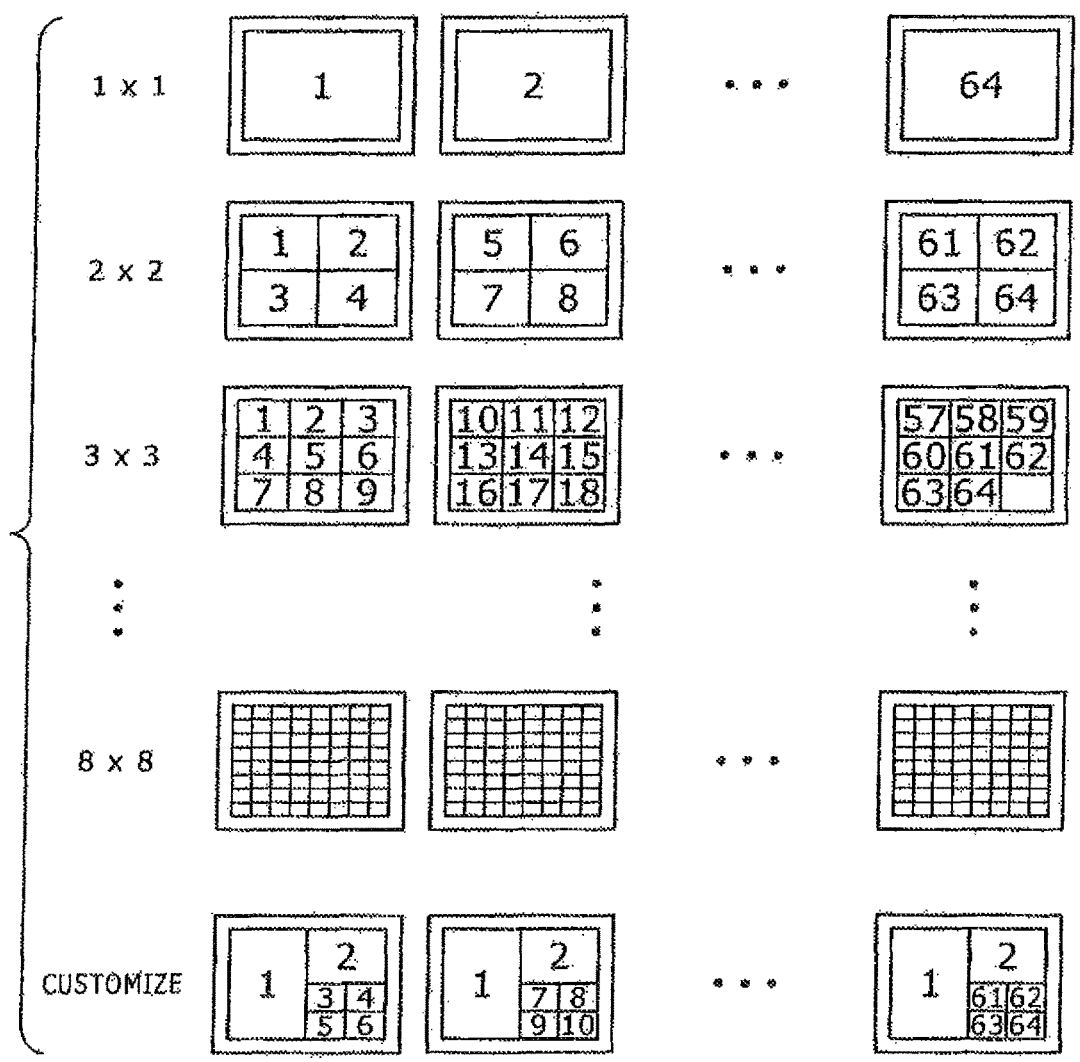
FIG. 7 is a schematic diagram illustrating an exemplary allocation database indicative of correlation between layout and camera ID.

Referring to FIG. 7, there is shown a schematic diagram illustrating an exemplary allocation database indicative of the correlation between layout and camera ID. With the image monitoring system according to the present embodiment, default layouts 1×1 through 8×8 are prepared. In order to allow the connection of a maximum of 64 cameras, "1" through "64" camera IDs are allocated to windows of each layout. The user cannot change the camera IDS allocated to default layouts.

In addition to default layouts, customized layouts which the user can change allocation of layouts as desired is provided. Customized layouts allow the user to set, as desired, window sizes and the number of windows to be arranged and make registration of which camera ID to which window, for example.

Figure 8:
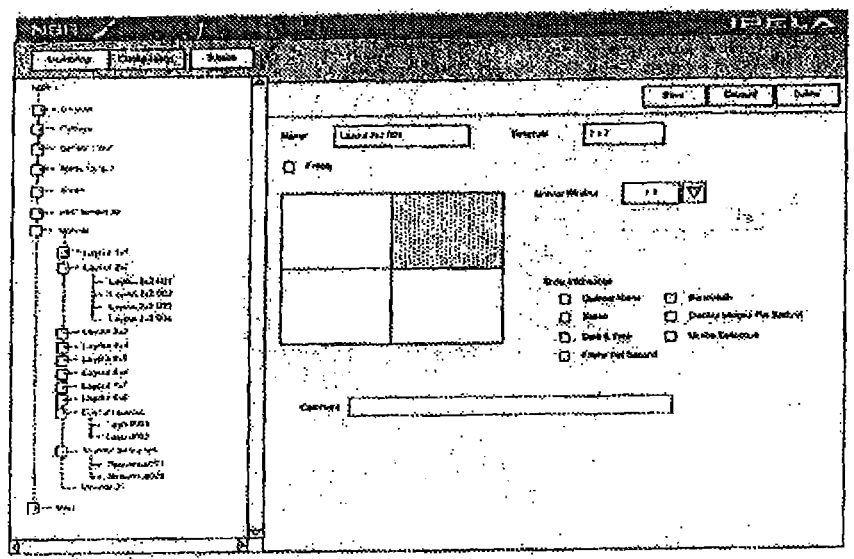
FIG. 8 is a diagram illustrating an exemplary default layout setting screen.

Referring to FIG. 8, there is shown an exemplary a default-layout setting screen. This example shows a setting screen for a 2×2 layout, in which a layout tree structure is shown to the left side of the setting screen while detail settings of the 2×2 layout are shown to the right side. With default layouts, the contents of setting are only displayed and therefore not to subject to change by the user.

Figure 9:
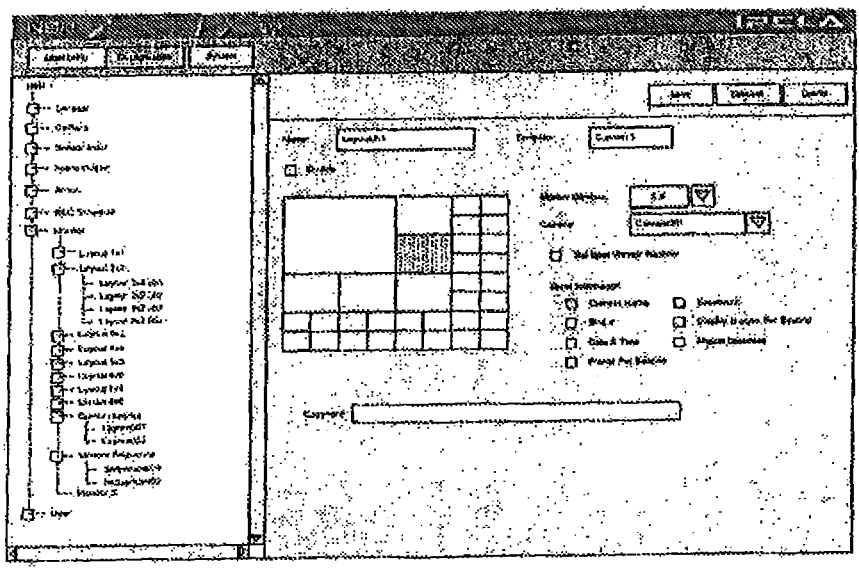
FIG. 9 is a diagram illustrating an exemplary customized layout setting screen.

Referring to FIG. 9, there is shown an exemplary setting screen of a customized layout. Customized layouts allow the user to select display and non-display modes, specify layout name, window arrangement, window size, and camera ID for each window, specify hot spot, display information, and specify comment. This setting screen allows the user to manually allocate desired layouts and camera IDs.

Figure 10:
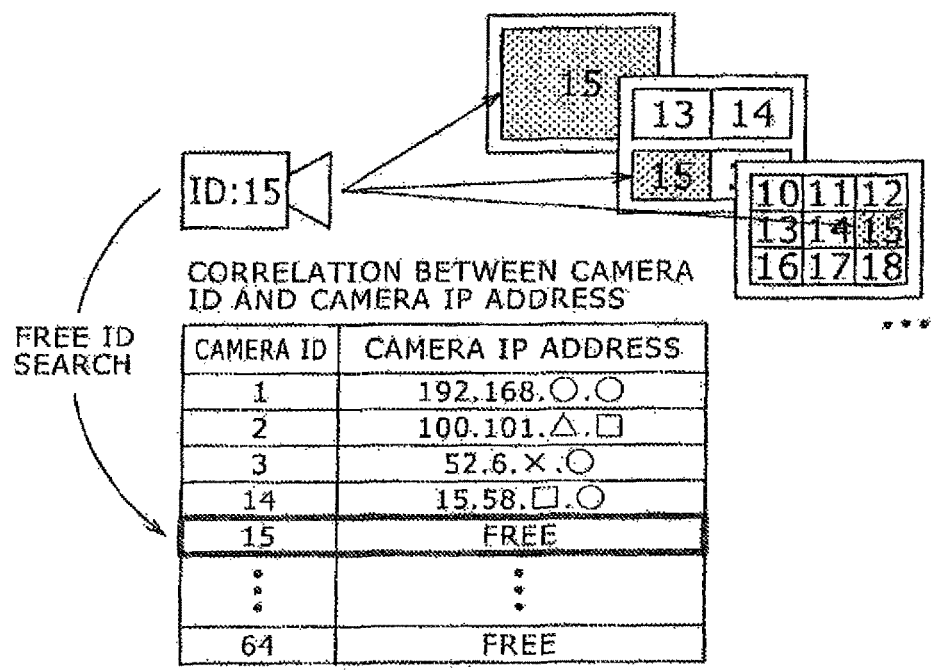
FIG. 10 is a schematic diagram illustrating a specific example of adding cameras.

Referring to FIG. 10, there is shown a schematic diagram illustrating the addition of cameras. If a new camera is connected to the network with a layout as described above prepared, the database containing the correlation between camera ID and camera is first searched for a free, lowest-numbered camera ID. In the example shown in FIG. 10, the database has camera IDs "1" through "14", so that the free, lowered-numbered camera ID is "15". Therefore, the IP address of the added camera is registered at this camera ID "15". Consequently, the camera having camera ID "15" is identified and an image captured by the camera of camera ID "15" is displayed in a window allocated with camera ID "15" in a layout prepared in advance. This setup allows the user to display images captured by the newly added camera in the window automatically allocated upon connection of that camera to the network, without executing a special window allocating operation.

Figure 11:
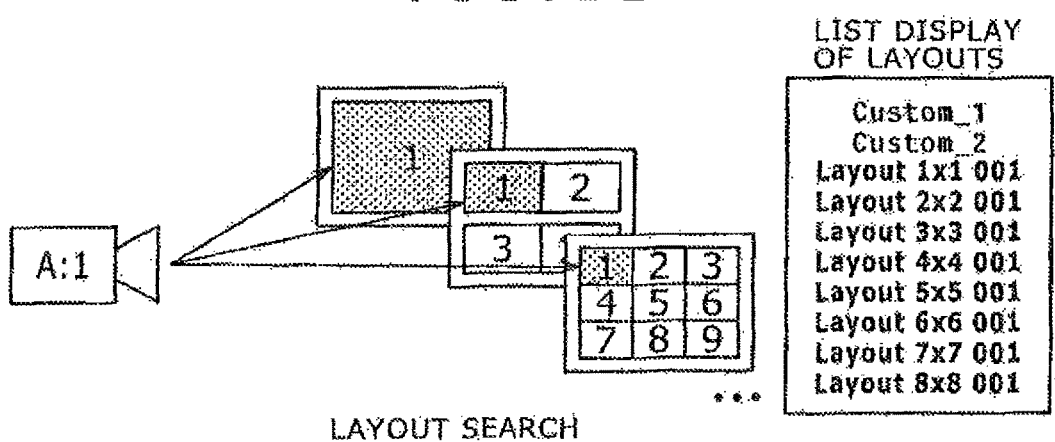
FIG. 11 is a schematic diagram illustrating a specific camera layout selecting operation.

Now, a flow of selecting a layout from many layouts in which images captured by a particular camera can be displayed will be described below. Referring to FIG. 11, there is shown a schematic diagram illustrating the selection of a layout for a particular camera. First, the user specifies a particular camera that captures images to be referenced. In the example shown in FIG. 11, camera A is specified. When particular camera A is specified, the image monitoring system according to the present embodiment searches for the camera ID corresponding to camera A and displays all layouts in a list form that contain a window to which that camera ID is allocated. This list is displayed in the option window shown in FIG. 3 for example. The user selects a desired layout from this list. Consequently, the user can easily and quickly select desired layout from many layouts in which images of a particular camera can be displayed.

While preferred embodiments of the present invention have been described using specific terms, such description is for illustrative purpose only, and it is to be understood that changes and variations may be made without departing from the spirit or scope of the following claims.

What is claimed is:

1. An image monitoring system comprising:
a plurality of video sources connected to a network;
a display configured to display video images provided by the video sources;
processor circuitry configured to generate layout information to control the display to display the video images in accordance with a layout selected from a plurality of layouts, the layout information defining positions of video images to be displayed in the display; and
a memory configured to store preset information of at least a first layout and correlation information between identification of the plurality of video sources and position information in the first layout;
wherein the processor is configured to control the display to display the plurality of video images in accordance with the preset information stored in the memory.

2. The image monitoring system according to claim 1, wherein the processor circuitry is further configured to control the display to display a list of the plurality of video sources and at least one of the video images on a single screen.

3. The image monitoring system according to claim 2, wherein the processor circuitry is further configured to control the display to display an icon for displaying at least one of the video images on a full screen.

4. The image monitoring system according to claim 3, wherein the layout information defines windows in the display; and wherein the processor circuitry is further configured to control the display to display an icon for selecting a layout which has two or more windows.

5. The image monitoring system according to claim 4, wherein the processor circuitry is further configured to control the display to display an icon for switching contents to be displayed on an entire screen.

6. The image monitoring system according to claim 1, wherein the plurality of layouts has a first layout and a second layout, wherein the first layout has a first window and a second window of different window sizes, and the second layout has a plurality of third windows having the same size.

7. The image monitoring system according to claim 6, wherein the first window is arranged at a left side of a display screen of the display, and the second window is arranged at a right side of the display screen.

8. The image monitoring system according to claim 6, wherein the second layout is comprised of four third windows displayed as an array of two windows by two windows.

9. The image monitoring system according to claim 1, wherein one of the video sources is a data store, and the processor circuitry is further configured to reproduce video images stored in the data store.

10. The image monitoring system according to claim 1, wherein the one of video sources is a camera.

11. The image monitoring system according to claim 10, wherein the processor circuitry is further configured to receive an input for controlling at least one of panning, tilt, and zoom of the camera.

12. The image monitoring system according to claim 1, wherein, the processor circuitry controls the display to display a list of all the selectable display layouts for a selected video image when the processor circuitry receives a command for displaying the video image captured by a selected video source.

13. The image monitoring system according to claim 1, wherein the processor circuitry is further configured to control the display to display a layout setting window, and to receive an input a user input to change the setting of the video sources or the layout.

14. The image monitoring system according to claim 1, wherein the network exhibits a configuration that is setup according to the layout information.

15. The image monitoring system according to claim 14, wherein the video sources have IP addresses, and wherein the network configuration is setup based on the IP addresses of the plurality of video sources.

16. Image monitoring apparatus, comprising:
processor circuitry configured to generate layout information to control a display to display video images provided by a plurality of video sources in accordance with a layout selected from a plurality of layouts, the layout information defining positions of video images to be displayed in the display; and
a memory configured to store preset information of at least a first layout and correlation information between identification of the plurality of video sources and position information in the first layout;
wherein the processor is configured to control the display to display the plurality of video images in accordance with the preset information stored in the memory.

17. A method of monitoring images provided by a plurality of video sources, comprising:
generating layout information to control a display to display video images provided by the video sources in accordance with a layout selected from a plurality of layouts, the layout information defining positions of video images to be displayed in the display;
storing preset information of at least a first layout and correlation information between identification of the plurality of video sources and position information in the first layout; and
displaying the plurality of video images in accordance with the preset information stored in the memory.

18. A non-transitory computer readable medium having recorded thereon instructions for controlling a processor for an image monitoring system to:
generate layout information that controls a display to display video images provided by a plurality of video sources in accordance with a layout selected from a plurality of layouts, the layout information defining positions of video images to be displayed in the display;
store preset information of at least a first layout and correlation information between identification of the plurality of video sources and position information in the first layout; and
display the plurality of video images in accordance with the preset information stored in the memory.

* * * * *